Jan. 21, 1930. E. M. MATTHEWS 1,744,404
AUTOMOBILE BRAKE MECHANISM
Filed July 10, 1928 2 Sheets-Sheet 2

Inventor
Eugene M. Matthews,
By J. Stanley Burch
Attorney

Patented Jan. 21, 1930

1,744,404

UNITED STATES PATENT OFFICE

EUGENE M. MATTHEWS, OF OKLAHOMA CITY, OKLAHOMA

AUTOMOBILE BRAKE MECHANISM

Application filed July 10, 1928. Serial No. 291,509.

This invention relates to improvements in brake mechanism, and is more particularly concerned with automobile brakes of the friction band type.

In the construction of automobile brakes, it is customary to provide two sets of brakes which may be operated selectively. The brake sets are usually comprised of a brake drum and an inner and an outer brake adapted to bear upon the inner and outer circumferential surfaces of the drum. The outer brake band usually serves as a service brake, while the inner brake is generally used only in an emergency. The usual practice in constructing the outer brake is to arrange a flexible steel band having a suitable lining of fibrous material substantially around the entire circumference of the drum and which is adapted to be contracted onto the drum by a suitable control or pedal positioned at the driver's seat. The intermediate portion of the band is mounted on the axle housing of the automobile, while the ends thereof are connected by suitable linkage to each other and with the driver's control lever. A spring associated with the linkage serves to expand the band out of contact with the drum surface when the brake is released.

In this type of automobile brake, it is frequently necessary to renew the brake lining which necessitates disconnection of the linkage. Another objection to this arrangement is that the flexible metallic band or shoe, while initially arranged to support the lining with a slight clearance between the lining and the surface of the brake drum, becomes permanently distorted and permits the lining to continuously rub on the brake drum when the brake is not in use. This consequently results in a premature destruction of the brake lining. As the leverage reduction from the drver's control to the brake lever is very great, the clearance space between the drum and the lining is necessarily limited, as an increase in this clearance would require a considerably greater movement of the driver's control lever.

The general object of my invention, therefore, is the provision of an automobile brake of simple and durable construction, wherein the brake lining may under all conditions be supported with a uniform clearance between the lining and the drum surface.

Another object is the provision of novel mechanism arranged to uniformly constrict all portions of the lining upon the drum surface to render effective braking action with a minimum application of manual force.

A more specific object of my invention is to provide a brake mechanism in which the band may be conveniently removed without necessitating disconnection of the parts of the operating linkage.

Other objects will appear as the nature of the invention is better understood, and the same consists in the novel form, combination and arrangement of parts hereinafter more fully described, shown in the accompanying drawings and claimed.

In the drawings:

Figure 3 is an enlarged fragmentary section on line 3—3 of Figure 1.

Considerable difficulty has heretofore been experienced with brake mechanism wherein the brake lining is carried by a brake band extending substantially around the circumference of the brake drum, for the continuous use of the brake mechanism causes the permanent setting of the band which supports the lining. In a great many cases the lining rests in contact with the rotating drum surface when the brake mechanism is not in use. As it is impractical to provide any considerable clearance between the brake drum and the brake lining due to the multiplication of the lever ratios from the driver's position to the drum, it is evident that in any successful brake mechanism the brake lining should be maintained out of contact with the drum with very slight clearance therebetween. To meet this requirement, I have provided a series of substantially uniformly spaced brake band contracting and expanding devices entirely about the circumference of the brake band, and have operatively connected all of such devices with a common operating means for simultaneous corresponding actuation, as illustrated in the accompanying drawings.

Figure 1:
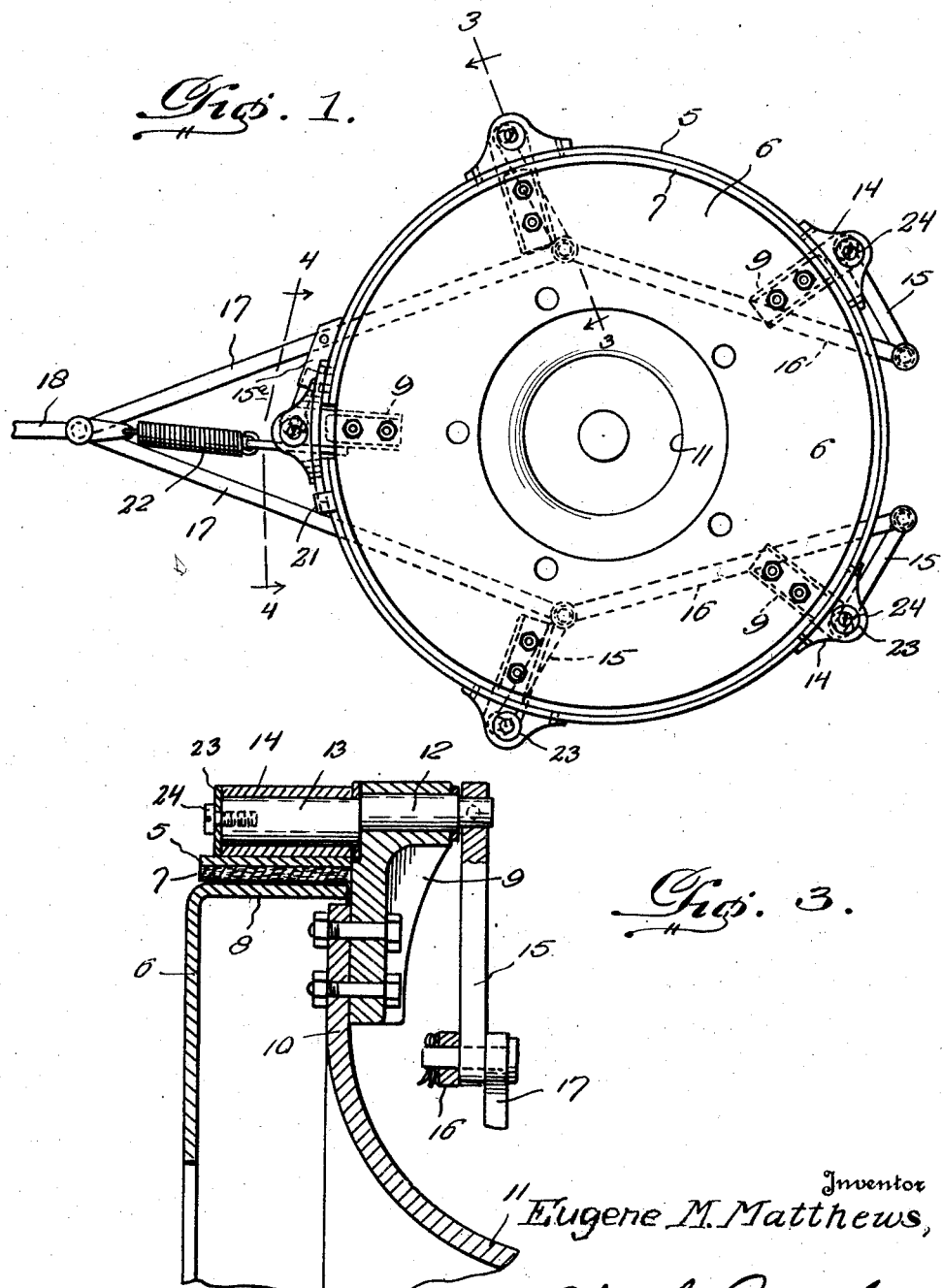
Figure 1 is an outer side elevational view of an automobile brake mechanism embodying the present invention.
Figure 2:
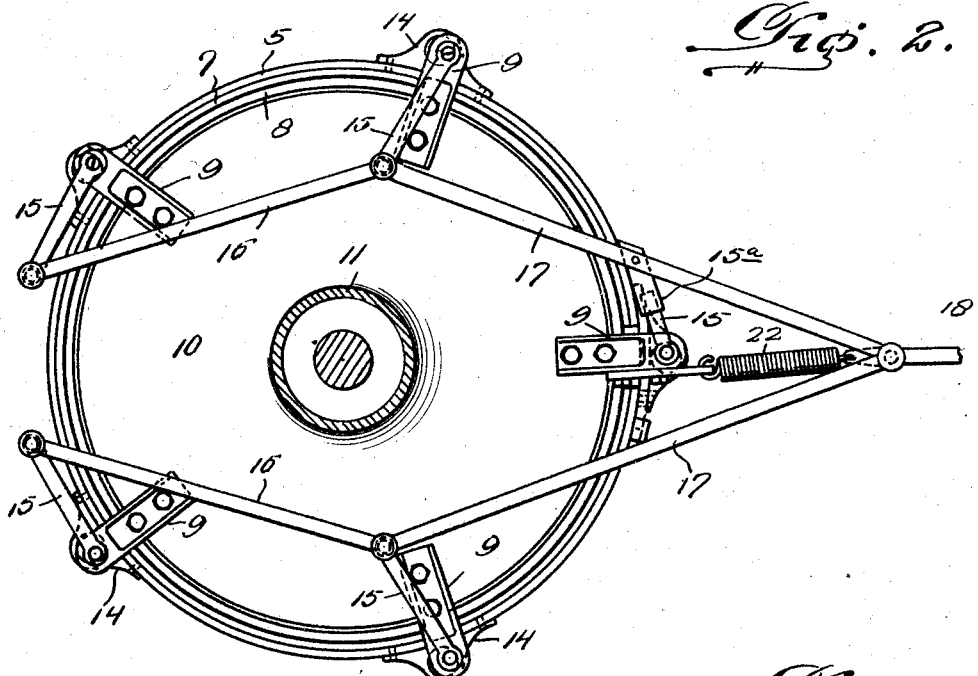
Figure 2 is an inner side elevational view thereof.
Figures 4, 5:
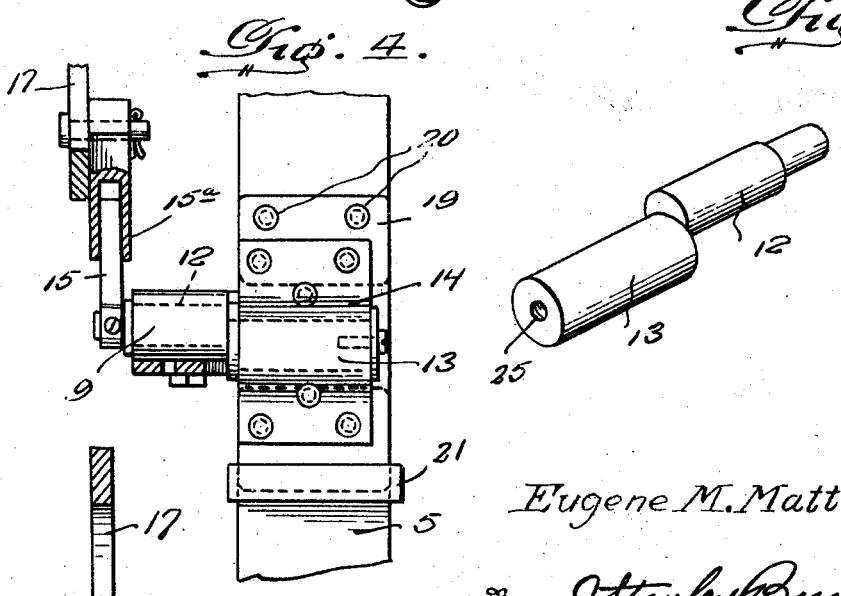
Figure 4 is an enlarged fragmentary section on line 4—4 of Figure 1.
Figure 5 is an enlarged perspective view of one of the crank shafts of the brake band contracting and expanding means.

Referring in detail to the drawings, 5 indicates the usual circular brake band extending substantially around the entire circumference of the brake drum 6 and having a suitable brake lining 7 secured to the inner face thereof and adapted to bear upon the flanged portion 8 of the drum 6, when the band 5 is contracted. For bringing the brake lining carried by the brake band into contact with the brake drum, I have provided a mechanism including a series of brake band contracting and expanding devices mounted in uniformly spaced relation about and connected to the brake band, and each of such devices embodies a supporting bracket 9 rigidly secured to the margin of a supporting flange 10 rigid with the end of the rear axle housing 11 of the automobile, a crank shaft 12 journaled in the outer end of the bracket 9 and having an eccentric or crank pin 13 rigid with the outer end thereof and extending outwardly across the brake band 5, and a bearing bracket 14 secured on the outer surface of the brake band 5 and having a transverse bearing opening in which the eccentric or crank pin 13 is revolubly fitted. The inner end of each crank shaft 13 is preferably reduced in diameter and has a crank arm 15 secured thereon so that a forward pull upon said crank arm will effect turning movement of the crank pin 13 for causing forward displacement and inward movement or contraction of the band 5, while a rearward movement of said crank arm will cause slight rearward displacement and expansion of the band, to respectively apply or release the brake with respect to the flange 8 of the drum 6. The inner ends of the crank arms 15 are interconnected for simultaneous similar actuation by means of a pair of links 16, connecting the crank arms 15 respectively above and below the rear axle housing 11, and further links 17 connect the forward upper and lower crank arms 5 with the usual pull rod 18 adapted to be extended to and connected to the driver's pedal in the usual way. As shown, two brake band expanding and contracting devices are preferably employed at spaced points at the rear of the brake band above and below the axis of the brake drum and a further pair of such devices are preferably arranged near the front of the band above and below the axis of the brake drum. In addition to this, an expanding and contracting device is also preferably arranged at the forward meeting ends of the brake band, and in the latter instance, the construction of the device is similar to that above described except that the lever 15$^a$ is of the freely extensible type and operatively connected to one of the links 17, the associated bearing bracket 14 being fixed upon a mounting plate 19 as shown in Figures 1 and 4. This mounting plate 19 is attached at one end as at 20 to one end of the brake band 5 and extends across the space between the ends of the brake band for slidable engagement in a guide loop 21 attached to the other end of the brake band. In this way, the relative displacement of the ends of the brake band is permitted, while the ends of the band are maintained in alinement or against material relative lateral displacement. The lever or crank arm 15$^a$ may consist of a tubular section pivoted to the link 17 and slidably receiving a section fixed on the end of the associated crank shaft 13 as shown clearly in Figure 4.

From the foregoing description, it will be seen that when the rod 18 is drawn forwardly by the driver's control lever, the crank arms 15 and 15$^a$ will be swung forwardly so as to shift the crank pins 13 toward the ends of the brake band 5 and toward the axis of the brake drum 6, thus affecting a shifting of the brake band bodily toward the brake drum and simultaneously contracting it into engagement with the flange 8 of the drum to a corresponding degree at a plurality of spaced points located at the meeting ends of the brake band and at uniformly spaced points between such ends. It is therefore evident that a uniform and efficient braking action will be had with a minimum application of manual force.

To maintain the brake band and its lining in normal clearing position out of contact with the drum and with the uniform clearance therebetween, it is simply necessary to effect rearward movement of the rod 18 to simultaneously shift the crank arms 15 and 15$^a$ rearwardly. The rod 18 is shifted rearwardly for this purpose by suitable yieldable means such as a spring 22, whereby the brake is automatically normally released upon release of the brake pedal of the automobile. As shown, the spring 22 is of the tension type and preferably connected at its forward end to the rear end of the rod 18 and at its rear end to the bracket 9 arranged adjacent the meeting ends of the brake band 5 at the forward side of the brake drum 6.

In the illustrated embodiment of the invention, the pressure is applied to the brake band in five different places through the medium of a forward shifting and inward flexing or contraction of said band. In a like manner, when the brake is released, the brake band is lifted clear of the brake drum at these five different points, eliminating any possibility of drag as is common in the types of brake mechanisms now in general use. Moreover, the present arrangement provides for extreme ease of operation, substantially uniform use of the entire surface of the brake lining, and mounting of the brake band at a series of points so as to effectively prevent rattling. As shown, the brake band is retained upon the crank pins 13 by means of washers or cap plates 23 fastened against the outer ends of the crank pin 13 and the bearing brackets 14 by means of stud bolts 24 passing through said cap plates and threaded into axial sockets provided in the crank pins 13 as indicated at 25 in Figure 5. It may be further particularly noted that the crank pins 13 form the sole mounting means for the brake band eliminating the necessity for any special separate mounting brackets and brake band adjustments, while permitting ready removal of the brake band bodily from the crank pins 13 by an outward lateral displacement thereof when the stud screws 24 are removed. Obviously, the flexing and shifting of the brake band at a plurality of spaced points provides for powerful application of the brake with a minimum amount of effort on the part of the driver in pressing upon the brake lever.

From the foregoing description it is believed that the construction and operation as well as the advantages of the present invention will be readily understood and appreciated by those skilled in the art.

Minor changes may be made without departing from the spirit and scope of the invention as claimed, and it is obvious that the same principle may be applied to expanding brakes by utilizing the expansion to apply the brakes and the contraction to release them.

What I claim as new is:

1. In an automobile brake mechanism, the combination of the rear axle housing, a brake drum, a brake band extending substantially around the circumference of the brake drum, transversely disposed bearing brackets secured at spaced intervals on the outer face of the brake band, radially disposed brackets secured at their inner ends to the rear axle housing for disposition adjacent said brake drum, transversely disposed crank shafts journaled for rotation in the outer ends of the radially disposed brackets, an eccentric crank pin formed on the outer end of each crank shaft for disposition within the respective transverse bearing brackets, crank arms operatively connected at their outer ends with the inner ends of the respective crank shafts for actuating the same, a remotely operated rod, and links operatively connecting the inner ends of the crank arms with the operating rod as and for the purpose described.

2. In an automobile brake mechanism, the combination of the rear axle housing, a brake drum, a brake band extending substantially around the circumference of the brake drum, transversely disposed bearing brackets secured at spaced intervals on the outer face of the brake band, radially disposed brackets secured at their inner ends to the rear axle housing for disposition adjacent said brake drum, transversely disposed crank shafts journaled for rotation in the outer ends of the radially disposed brackets, an eccentric crank pin formed on the outer end of each crank shaft for disposition within the respective transverse bearing bracket, crank arms operatively connected at their outer ends with the inner ends of the respective crank shafts for actuating the same, a remotely operated rod, and links operatively connecting the inner ends of the crank arms with the operating rod as and for the purpose described, certain of the crank shafts and the bearing brackets for the crank pins being arranged above and below the axis of the brake drum intermediate the ends of the brake band, and another of the crank shafts and its connection with the brake band being operatively associated with the adjacent ends of the brake band.

In testimony whereof I affix my signature.

EUGENE M. MATTHEWS.